Aug. 14, 1945. F. C. LORNITZO 2,381,918
FLOW CONTROL FOR PRESSING MACHINES
Filed Feb. 1, 1941 4 Sheets-Sheet 1
Fig. 1.
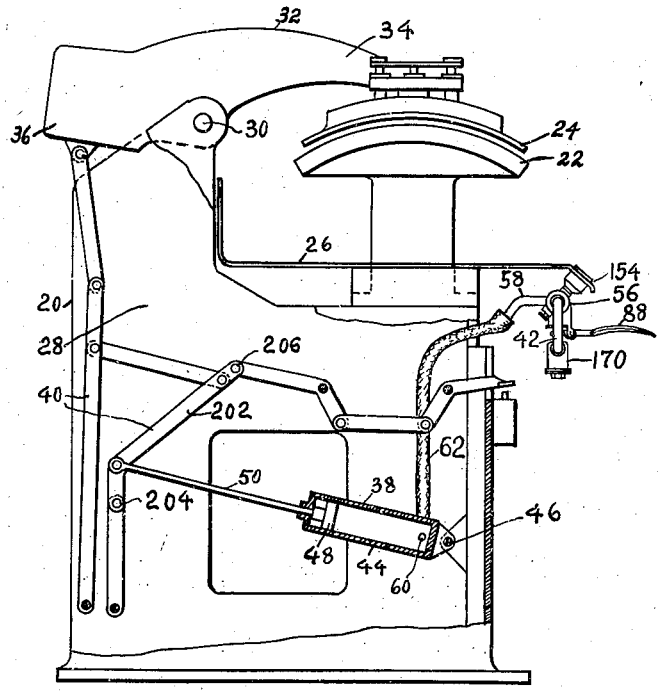
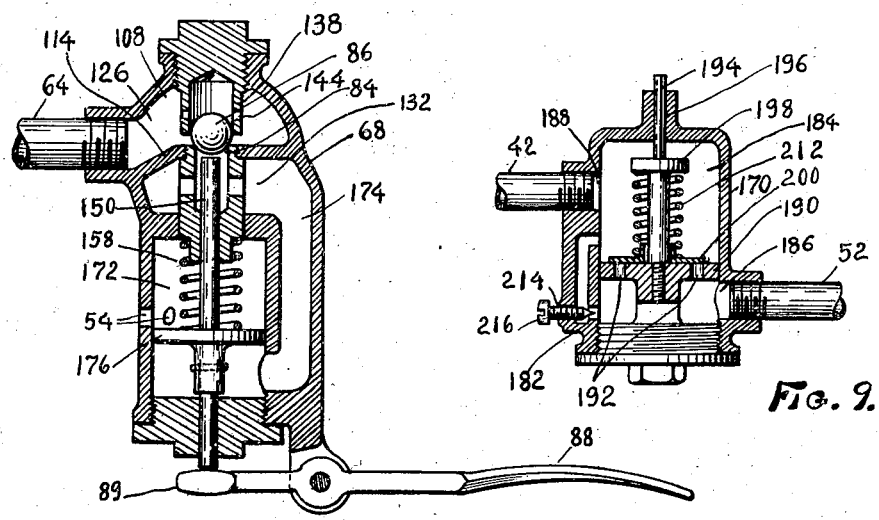
Fig. 8.
Fig. 9.
INVENTOR
FRANK C. LORNITZO
BY
Thomas A. Jenkins
ATTORNEY Aug. 14, 1945.  F. C. LORNITZO  2,381,918
FLOW CONTROL FOR PRESSING MACHINES
Filed Feb. 1, 1941  4 Sheets-Sheet 2

INVENTOR
FRANK C. LORNITZO
BY
Thomas A. Jenkes
ATTORNEY

Aug. 14, 1945.   F. C. LORNITZO   2,381,918
FLOW CONTROL FOR PRESSING MACHINES
Filed Feb. 1, 1941   4 Sheets-Sheet 4

INVENTOR
FRANK C. LORNITZO
BY
Thomas A. Jewelen
ATTORNEY

Patented Aug. 14, 1945

2,381,918

UNITED STATES PATENT OFFICE 2,381,918

FLOW CONTROL FOR PRESSING MACHINES

Frank C. Lornitzo, Pawtucket, R. I., assignor to Pantex Pressing Machine, Inc., Central Falls, R. I., a corporation of Delaware Application February 1, 1941, Serial No. 377,018

19 Claims. (Cl. 121—38)

My invention relates to controls for pressing machines of a general type shown in my co-pending patent applications for Safety control for pressing machines, Ser. No. 364,287 filed October 28, 1940, Control for pressing machines, Ser. No. 376,286 filed January 28, 1941 and Latch control for pressing machines, Ser. No. 376,860 filed January 31, 1941.

An object of my invention is to provide an alternative type of structure embodying the safety features shown in said application Safety control for pressing machines, wherein, for safety purposes, both of the operator's hands are required for the actuation of a pair of handles until the pressing members have been brought into pressing juxtaposition, when they may be released during the pressing operation.

An object of my invention is to provide a flow control particularly adapted for pressing machines embodying the general principles shown and claimed in my application for patent for Control for pressing machines aforesaid, wherein a movable flow control member is provided in the flow line for the fluid motor for actuating the pressing machine or other mechanism movable back and forth from a position permitting the flow of fluid through said line to a flow stopping position, automatically movable to one of said positions by the flow of fluid through said line, and means for moving said movable control member to its other position. In said application Control for pressing machines, the embodiment of such a flow control member comprises a valve manually operable in one direction and automatically movable by the flow in the opposite direction to control the fluid motor, and in the specific embodiment of mechanism shown in said application embodying three valves of this general type. In my application for patent for Latch control for pressing machines aforesaid, the flow control member movable by the flow into one of its positions comprises means for actuating a latch for retaining other flow control mechanism in one position or for actuating other flow control mechanism, said flow control member being automatically returnable in the opposite direction to its other position by a spring, by the flow itself, or by gravity. In the embodiment of flow control mechanism shown in the present application, I have employed both such types of flow control members, namely, the valves, as shown in said application Control for pressing machines and an analogous type of means for locking the mechanism in an actuating position, controlled in its movement in one direction by the flow alone, to that shown in said other application, Latch control for pressing machines, aforesaid.

A further object of my invention, therefore, is to provide a control for pressing machines or other movable members, comprising a plurality of flow control members, the movement of each of said flow control members in one direction to control the device being automatically controlled by the flow of fluid through the control system.

As in said application for Latch control for pressing machines, I preferably employ the diminution of flow in the flow line caused by the pressing members being brought into pressing juxtaposition to actuate a locking means, thereby permitting the release of the handles during the application of ironing pressure on further actuation of the fluid motor. A further object of my invention therefore, is to provide means for locking the control system to permit the diminished rate of flow to apply an increased ironing pressure after release of the handles from that shown in any of said applications, in this instance its movement in one direction being fully controlled by variation or diminution in the rate of flow in the flow line itself.

A further object of my invention relates to a specific improvement over the flow control structure shown in my aforesaid application Control for pressing machines, eliminating the primary exhaust valve shown therein as separate means to keep the outlet line closed during the rapid stroke of the head being brought to pressing juxtaposition with the buck or any other rapid stroke, and modifying the supplemental exhaust valve shown in said application so that it may be actuated by an actuator in the inlet line controlled by the rate of flow or diminution in the rate of flow therethrough, in place of being controlled by the cylinder, or part of the mechanical actuating mechanism, as shown in said application. I preferably construct said fluid controlled actuator so that it will cease to actuate the means for opening the exhaust valve during the application of ironing pressure on the diminution of flow, and may, for safety purposes on release of one handle or both handles, automatically open the exhaust valve on a rapid flow of fluid through the exhaust line to exhaust the fluid motor.

A further object of my invention is to provide an attachment for the exhaust valve in which the flow therethrough will automatically retain the exhaust valve open after its opening movement is initiated by movement of the handle therefor.

Another object of my invention is to utilize a remote manual control for the flow control member as shown in said aforesaid applications Control for pressing machines and Latch control for pressing machines, whereby the movement of a manually controlled priming means remote from the flow control member to be actuated will control the flow to actuate said remote flow control member, and I have specifically provided in this instance a structure wherein one manual control priming means may control the actuation of a plurality of flow control members at a spaced distance therefrom in said system.

A further feature of my invention is to provide a control for pressing machines which may be operated step by step by the proper manipulation of the various valves to relatively move the pressing members toward each other desired predetermined adjustable amounts.

A further feature of my invention is that I have provided a system in which the sensitivity thereof may be readily adjusted to meet the desired operating conditions.

A further object of my invention is to provide a device which may be alternatively constructed to provide a sustained pressure during the ironing operation, or to provide an increased pressure, with the addition of certain supplemental features to the system.

A further feature of my invention resides in the fact that I employ as operating valves a simple type of handle operating globe valve modified in each instance to achieve its particular desired function in the control system.

Further features of my invention relate to the specific construction of the specific valves shown, which, as stated, are all of a modified globe type and in which the valve closures may be aided in being brought to their desired positions by gravity functioning with or against the flow itself. While I have shown my invention as applied to the actuating means for a pressing machine, it is obvious that both the features of the flow control device themselves and the entire combination may, if desired, be applied to other uses.

Further features of my invention reside in modifications of the valves shown in said prior applications, and modification of the means shown therein operative to retain the exhaust valve in a permanently open position after an initial manual actuation thereof, and in the actuator I employ for automatically opening the exhaust valve, which actuator may be manually counterbalanced by the opposite hand from that employed for actuating the inlet valve during the actuation of the fluid motor, and permitting a manual counterbalancing rather than a manual actuation of the actuator while the fluid motor is being actuated to bring the pressing members into pressing juxtaposition.

Further features of my invention relate to the specific construction of the actuator itself to provide a structure permitting the bypassing of a rapid inlet flow therethrough to initially rapidly actuate said fluid motor rendered inoperative by a diminished inlet flow as said pressing members are brought into pressing juxtaposition.

A further feature of my invention relates to the specific means I preferably employ for bypassing a diminished inlet flow around said actuator to prevent actuation of said actuator by such a diminished inlet flow and the ingress of an increased amount of fluid to said fluid motor to provide a greater ironing pressure.

A further feature of my invention relates to improvements in the construction of the flow control members to permit gravity and the weight of said flow control members to function with or against the flow to close or open the respective valves and flow control members.

These and such other objects of my invention as may hereinafter appear will be best understood from a description of an embodiment thereof, such as is illustrated in the accompanying drawings.

In the drawings, Fig. 1 is a side elevation of a pressing machine equipped with my improved flow control means.

Fig. 2 is a diagrammatic view of inherent parts of my invention employed in a single control line having a branch going to the fluid motor intermediate the inlet and exhaust portions thereof with a manually operated inlet valve in the inlet portion and a manually operated exhaust valve in the exhaust portion and an actuator in the inlet portion for normally urging said exhaust valve to open position, constructed to be counterbalanced by the handle for the exhaust valve on a rapid flow of fluid through said inlet portion, and rendered inoperative by its own inherent construction on a diminished rate of flow of fluid through said inlet portion, the parts being shown herein in a static position.

Fig. 3 is a diagrammatic view of the parts shown in Fig. 2, with the operating handle for the inlet valve depressed to permit the flow of fluid to the fluid motor and to automatically close the exhaust valve, with the handle for the exhaust valve being manually retained in a position to counterbalance the tendency of the actuator to open the exhaust valve to permit the flow of fluid to the fluid motor to bring the pressing members into pressing juxtaposition.

Fig. 4 is a diagrammatic view of the parts shown in Figs. 2 and 3 after the actuator has become ineffective on the diminution of flow through the inlet portion after the pressing members have been brought into pressing juxtaposition to permit the release of one hand from the manually operated actuating means for the inlet valve and the other hand from the handle of the exhaust valve, with the inlet valve being retained in open position on a diminished flow of fluid being bypassed through the actuator to permit the application of additional ironing pressure to the pressing members.

Fig. 5 is a view of the parts shown in Figs. 2, 3 and 4 after the handle of the exhaust valve has been moved to a position to initially open the exhaust valve to exhaust the fluid motor to separate said pressing members, and showing in dotted lines the position said handle may assume after the means in said line actuated by the flow of fluid through said line functions to maintain said movable exhaust valve in a position free of said exhaust port to permit continuous exhaust flow of fluid out said exhaust valve after release of said handle.

Fig. 6 is a diagrammatic view of the parts shown in Figs. 2–5, showing the actuator functioning to additionally open the exhaust valve on a rapid flow of fluid through the inlet line when the handle for the exhaust valve is not manually retained in an inoperative position, while the handle for the inlet valve is being depressed to illustrate how the device would cease to function if the hand got knocked off the handle for the exhaust valve.

Fig. 8 is an enlarged vertical sectional view of the exhaust valve illustrating the handle for the initial actuation thereof, and the means in the exhaust line actuated by the flow of fluid for maintaining said movable exhaust valve in a position free of said exhaust port to permit the continuous flow of fluid therethrough, in a static position.

Fig. 9 is an enlarged vertical sectional view of the actuator for the exhaust valve handle located in the inlet portion of the flow line, in a static position.

Figure 2:
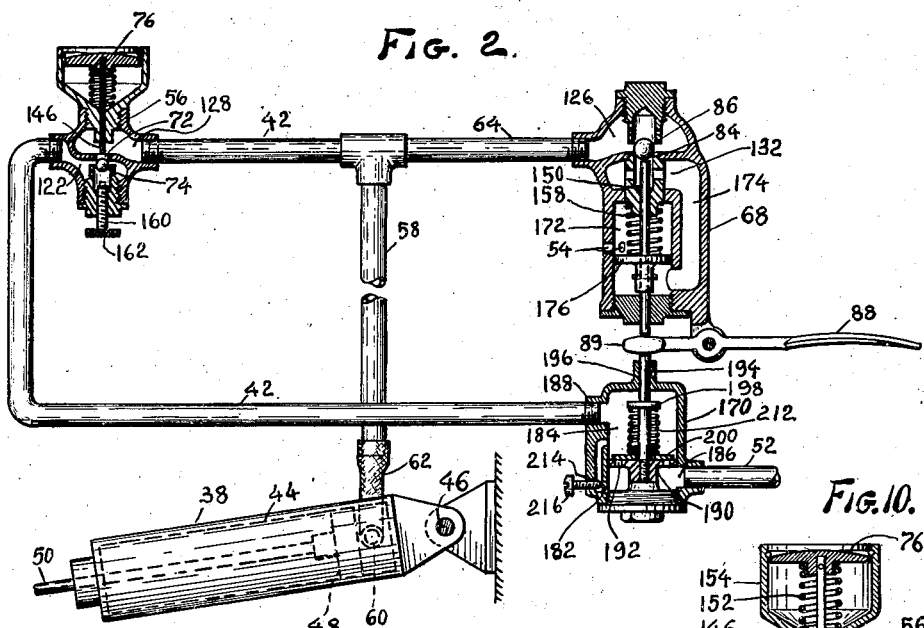
Figure 10:
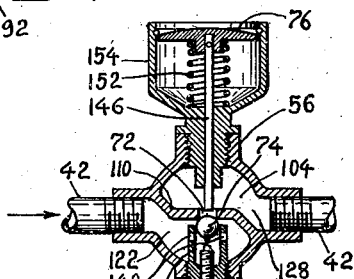
Fig. 10 is an enlarged vertical sectional view of the inlet valve.

In the drawings, wherein like characters of reference indicate like parts throughout, I have illustrated my improved flow control means for pressing machines applied to a garment pressing machine 20 of a standard type. Said pressing machine has mounted thereon relatively movable pressing members 22 and 24, in the embodiment shown comprising a stationary pressing buck 22 projecting upwardly from the usual table 26 mounted on the machine frame 28. The pressing head 24 is movable relative thereto and in the embodiment shown is pivotally mounted on the machine frame 28 by the pivot pin 30, preferably on a lever 32 of the first class having a power arm 34 on the end of which the movable pressing head 24 is pivotally mounted, and a weight arm 36 especially weighted to normally raise the pressing head 24 to an open position away from the buck 22. Suitable actuating means are provided for relatively moving said pressing members 22 and 24 to a pressing position, in the embodiment shown, comprising a fluid motor 38 and the linkage 40 actuated thereby to raise the weight arm 36 of said pressing lever 32. A suitable feed line 42 is provided for said fluid motor. In the embodiment shown, the fluid motor comprises a cylinder 44 pivotally mounted as at 46 on the machine frame 28 and having a piston head 48 reciprocatable therein with the piston rod 50 thereof suitably connected to the linkage 40 to actuate the linkage 40 to raise the weight arm 36 of the pressing lever to move the movable pressing head 24 into pressing juxtaposition with the buck 22. In the embodiment shown, the feed line 42 has an inlet end 52 connected to a source of fluid pressure supply and an exhaust end 54 on the opposite end thereof.

A similar flow-closable manually openable inlet valve 56, as shown in said application, Control for pressing machines, is provided in said feed or control line and beyond said valve 56, said line is provided with a branch 58 extending downwardly towards said cylinder 44, being connected to a suitable port 60 near the pivot end of said cylinder, in the embodiment shown, by the flexible hose 62. It is thus apparent that the portion of the control line 42 up to said branch 58 and said branch 58 and hose 62 form the inlet line to said fluid motor and that said hose 62, branch 58 and portion 64 of said feed line 42 beyond said branch 58 form the outlet line for said fluid motor. As stated hitherto, in the construction shown in this application, I eliminate the primary flow openable, manually closable exhaust valve shown in said application, Control for pressing machines, and modify the rest of my flow control mechanism to dispense with such primary exhaust valve. I provide a flow-closable manually openable exhaust valve 68 in said exhaust line of similar type to the supplemental exhaust valve shown in said application to permit flow of fluid therethrough to evacuate said fluid motor through the exhaust end 54 as shown by arrows in Fig. 5 to separate said pressing members 22 and 24 on manual opening of said flow-closable exhaust valve 68.

In the structure shown in said application, Control for pressing machines, I have provided means actuated by the fluid cylinder to render the handle for the supplemental exhaust valve shown therein inoperable until said pressing members 22 and 24 are brought into pressing juxtaposition, by automatically moving said handle to an inoperable position permitting a flow closing of said supplemental exhaust valve during the application of ironing pressure after the respective handles for the inlet valve 56 and the primary exhaust valve shown in said application have been released. In the embodiment shown in said application it is obvious that the flow will be effective to close said supplemental exhaust valve 86 so long as the handle 88 therefor is retained in a neutral position preventing opening of said supplemental exhaust valve 86. It is obvious, however, that alternatively may the handle 88, in the embodiment shown in either application, be manually maintainable in an inoperable position permitting self-closing of said exhaust valve 86 to permit the flow of fluid to keep said exhaust valve 86 closed while said pressing members 22 and 24 are being brought into pressing juxtaposition, thereby providing a two-hand control for the embodiment shown in this application, namely, (1) the depression of the handle 76 for the inlet valve 74, and (2) the maintaining of the handle 88 in a position to keep its actuating stem free of said exhaust valve 68.

The inlet valve 56 has an inlet valve port 72 and a movable valve member 74 normally urged to a position closing said inlet port by a rapid flow of fluid through the inlet portion of said control line. The means 76 for manual actuation of said valve comprises a handle manually operable preferably from adjacent the table 26 for moving said valve member 74 away from said port 72 to permit flow of fluid therethrough, said valve member 74 being capable of being retained in an open position by a diminished flow of fluid therethrough. The exhaust valve 68 has a valve port 84 and a movable valve member 86 urged to a closed position closing said port by a flow of fluid through said line and a manually operable handle 88 for moving said valve member 86 away from said port 84 to permit flow of fluid through said exhaust valve 68 to evacuate said fluid motor to permit separation of said relatively movable pressing members 22 and 24.

While any suitable type of flow-closable manually openable inlet valve 56 and any suitable type of flow-closable manually openable exhaust valve 68 may be employed, I preferably employ for this purpose two handle operated control valves mounted in said line of generally similar construction, each comprising respectively, a valve chamber 104 and 108 having a respective partition 110 and 114 having respective ports 72 and 84 therein, dividing said respective chambers 104 and 108 into respective inlet chambers 122 and 126 respectively and respective outlet chambers 128 and 132 respectively; a respective socket 134 and 138 projecting towards said respective port 72 and 84 in one of said chambers of each valve and terminating at a spaced distance therefrom and having a plurality of respective perforations 140 and 144 in the wall thereof adjacent the base thereof, a respective valve closure 74 and 86, preferably comprising a ball valve reciprocatable in said respective socket 134 and 138 to and from positions closing said respective port 72 and 84 and a respective valve stem 146 and 150 reciprocatable in each respective valve to and from positions moving said respective valve to close said respective ports 72 and 84, each having a reciprocatable handle 76 and 88 operable from without said valves 56 and 68 to abut and move said valve closures 74 and 86 relative to said ports 72 and 84.

One of said valves, namely, the valve 56 is flow-closable and is mounted in the inlet portion of said line in front of said cylinder branch 58 with the inlet chamber 122 underneath and having the socket 134 projecting upwardly therein, the valve stem 146 thereof projecting upwardly and having the operating button or handle 76 on the upper end thereof to lower the valve stem 146 to abut said valve 74 to free it from said chamber port 72 to open said valve and spring means 152 normally raising said valve stem 146 free of said valve, suitable means being provided for mounting said spring and operating button 76 above said valve adjacent said table, in the embodiment shown, comprising a handle socket 154 containing said spring 152 and button 76. The other of said valves, namely, the exhaust valve 68 is flow-closable and is mounted in the exhaust portion of said line with the socket 138 and valve 86 in the inlet chamber 126 thereof to permit fluid flow in said line to urge said valve 86 to a position closing said port 84. The valve stem 150 thereof is reciprocatable to move said valve closure 86 from said port 84 and spring means 158 normally urges said valve stem 150 free of said ball valve 86. The handle 88 thereof has an actuating portion or work arm 89 to move said valve stem 150 to move said valve 86 from said port 84.

In the embodiment shown, the inlet valve 56 is provided with the adjusting screw 160 projecting upwardly through said socket 134 to regulate the reciprocatable movement of the valve 74 in said socket and hence its sensitivity to kinetic pressure. The adjusting screw 160 is provided with the knurled handle 162 for raising it within said socket 134 to vary the reciprocative movement of the ball valve 74. By variations in the advancement of the adjusting screw the sensitivity of the ball valve to the velocity of the flow to which it responds may be so increased as to substantially close the valve on any flow of fluid through the inlet line 42 and 58. With this feature, it is obvious that a step-by-step actuation of the members is possible, the inlet valve with a suitable close adjustment automatically closing itself after a substantial actuation thereof. Should a step-by-step actuation be not desired, it is apparent that the adjusting screw may be adjusted to permit a greater movement of the ball valve 74.

In the embodiment shown, the inlet valve 74 and the exhaust valve 86 are of such a light weight as to be readily moved by the flow to positions closing their respective ports 72 and 84. The inlet valve 74 is also of such a weight that it may be maintained by gravity in an open position on a diminished flow of fluid through said inlet line 42. It is also apparent that gravity aids the retaining of the exhaust valve 86 in a closed position closing said port 84. As stated hitherto, I provide means 170 actuated by the flow of fluid in said inlet line to urge said handle 88 to move said exhaust valve 86 to an open position, automatically releasable with a delayed action by a diminished flow of fluid through said inlet line as said pressing members 22 and 24 are brought into pressing juxtaposition to permit flow closing of said exhaust valve 86 for a continued further actuation of said fluid motor to apply said maximum ironing pressure to said pressing members.

As stated hitherto, I provide means in the exhaust line 64 beyond said exhaust valve 68 adjacent the exhaust end of said exhaust valve actuated by the flow of fluid through said line for maintaining said movable exhaust valve member 86 in a position free of its port 84 to permit the continuous exhaust flow of fluid out the exhaust end 54 thereof after said handle 88 has been moved to initially move said valve member 86 away from said port to initiate the exhaust flow of fluid therethrough and out said end 54. In the preferred embodiment shown, said means includes an exhaust chamber 172 below said socket 138 having exhaust vent means 54 therein and connected to the outlet portion 132 of said exhaust valve 68 by the passage 174. Said chamber 172 is generally of cylindrical shape and has the valve stem 150 projecting downwardly therethrough. Said valve stem 150 has a counter-thrust piston 176 mounted thereon to be reciprocatable within said exhaust chamber 172 on reciprocation of said valve stem 150 to respective positions above and below said exhaust vent means 54 on the respective opening and closing of said exhaust valve 86 by said valve stem 150. In this embodiment the spring means 158 is interposed between the upper end of said exhaust chamber 172 and said counter-thrust piston 176 to normally urge said counter-thrust piston 176 and attached valve stem 150 to a closed position with said counter-thrust piston below said vent means 54. It is thus obvious that with this construction, when the exhaust hand lever 88 is pivoted downwards, the work arm 89 thereof will initially raise the valve stem 150 to cause it to raise the exhaust valve 86 from its port 84, permitting the exhaust flow of fluid out through the exhaust port 84, exhaust chamber 132, passage 174, and the flow itself will then function against said counter-thrust piston 176 to raise it against the pressure of the spring 158 in said chamber 172 to a position above said vent means 54 to permit the discharge of exhaust fluid out said vent means, continued fluid pressure against said piston 176 continuing to function to press it upwards above said vent means 54 to exhaust the exhaust fluid therethrough against the compression of said spring 158, and continuing to raise the exhaust valve 86 from its exhaust port 84 after the handle 88 has been released to move to the dotted line position shown in Fig. 5 until fluid is completely exhausted from the fluid motor 38, when the spring 158 will again urge said counter-thrust piston 176 below said vent means 54, permitting the exhaust valve 86 to fall by gravity to a position closing its port 84. It will be obvious that the counter-thrust piston 176 comprises a flow control member normally urged by the flow to one position thereof, in this instance its exhaust position to actuate the other flow control mechanism, in this instance the exhaust valve 86, said flow control member or piston 176 being automatically returnable to its other position by the spring 158 in accordance with the teachings of the flow control members shown in my co-pending application for Latch control for pressing machine aforesaid.

Figure 4:
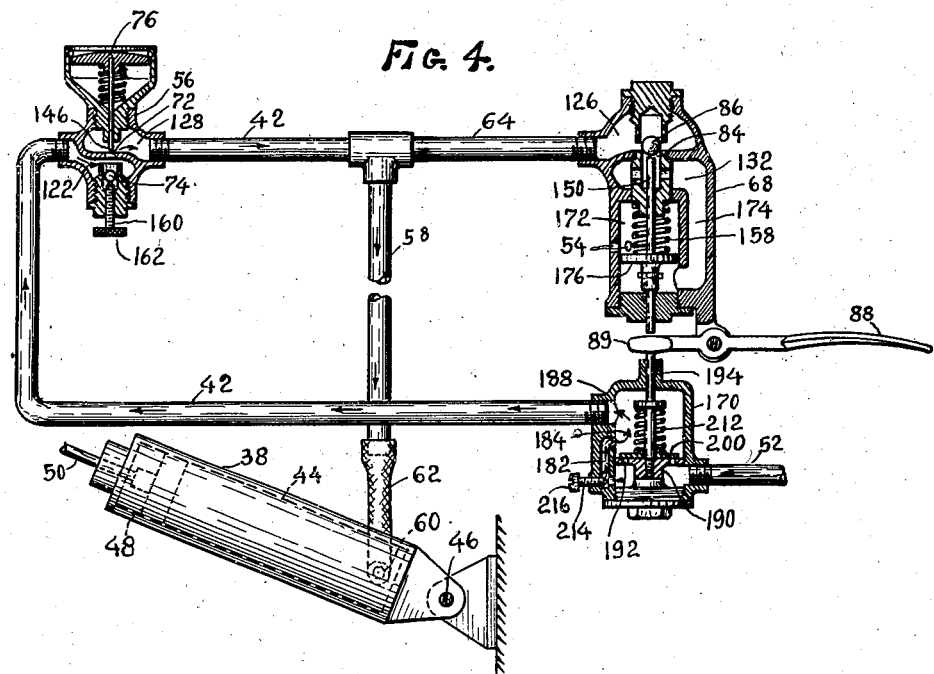

As stated hitherto, I provide means 170 actuated by the flow of fluid through said inlet line to urge said manually operated means 88 to move said exhaust valve 86 to an open position automatically releasable with a delayed action by a diminished flow of fluid through said inlet line as said pressing members 22 and 24 are brought into pressing juxtaposition to permit automatic flow closing of said exhaust valve 86 for a continued further actuation of said fluid motor to apply said ironing pressure to said pressing members. In order to permit the rapid flow of fluid through said inlet line 42, I provide means for bypassing the rapid inlet flow through said actuator or urging means 170 to initially rapidly actuate said fluid motor 38, said bypassing means being automatically rendered inoperative by a diminished inlet flow through said inlet line 42 as said pressing members 22 and 24 are brought into pressing juxtaposition. I may also provide, if it be desired to provide an increased ironing pressure to the pressing members during the pressing operation, means 182 for bypassing the diminished inlet flow around said urging means or actuator 170 to prevent actuation of said urging means on a diminished inlet flow to permit release of the manually actuated means 88 for controlling the exhaust valve 86, and the manually actuated means 76 for controlling the inlet valve 74 during the application of the maximum ironing pressure. When this bypassing means 182 is employed, the inlet valve 76 is preferably of such a weight as to be retained in an open position on a diminished rate of flow through said inlet line 42, as shown in Fig. 4.

In the preferred embodiment shown, said urging means in said inlet line includes a vertically extending cylindrical enlargement 184, preferably in the portion of the inlet line immediately below said exhaust valve 86, valve stem 150 and work arm 89 of said handle 88. In the embodiment shown, said enlargement 184 is provided with an inlet port 186 at the lower end thereof, and an outlet port 188 therein near the upper end thereof, the inlet line 42 being split for this purpose and having portions thereof joined to said respective ports. The actuating means per se comprises a piston 190 movable back and forth in said enlargement 184 having vent means 192 therein, in the embodiment shown comprising an annular series of holes. Said piston 190 also has a piston rod 194 projecting integrally therefrom through a suitable hole 196 in the upper end of said enlargement 184 to abut the work arm 89 of said handle 88 to move said valve stem 150 to initiate the opening of the exhaust valve 86. Said piston rod 194 is provided with an annular stop 198 substantially centrally thereof to limit the upward movement of said piston within said enlargement 184.

In the embodiment shown, said means for bypassing a rapid inlet flow through said urging means 170 to initially rapidly actuate said fluid motor, automatically rendered inoperative by a diminished flow, comprises said vent means 192, a relief valve 200 for closing said vent means 192 and spring means 212 seated on said stop 198 and abutting said relief valve 200 to move said relief valve to a position normally closing said vent means 192, and being automatically yieldable to permit a rapid flow of fluid through said vent means. It is also obvious that with this construction said piston 190, piston rod 194 and relief valve 200 are automatically movable by gravity to the bottom of said enlargement on diminution or cessation of flow therethrough to thereupon cease pressing upwardly on the work arm 89 of said operating handle 88 to urge said exhaust valve 86 to an open position and permitting said exhaust valve 86 to be urged to a closed position by gravity and the flow of fluid through said exhaust line 64.

The means 182 I preferably employ for by-passing the diminished inlet flow around said urging means or piston 190 to prevent actuation of said urging means on a diminished inlet flow to permit release of said manually actuated means 88 for controlling the exhaust valve 86 and said manually actuated means 76 for controlling the inlet valve 74 during the application of an increased maximum ironing pressure comprises the adjustable bypass line 182 of lesser diameter than the normal diameter of said inlet line 42 connected to said enlargement 184 beyond the extremities of movement of said piston 190 therein. To render said bypass line 182 of an adjustable diameter, I preferably provide the threaded hole 214 radial thereto, and an adjustable needle valve 216 threadably adjustable in said threaded hole. It is obvious that the piston 190 is a flow control member for actuating the handle 88 and exhaust valve 86 movable in one direction by the flow, and also automatically returnable by gravity in accordance with the teachings of my aforesaid patent application, Latch control for pressing machines. It is also obvious that the relief valve 200 also comprises a valve member movable to one position by the flow of fluid therethrough and automatically returnable to its other closed position by means of the spring 212, in accordance with the teachings of said patent application.

Fig. 2 illustrates the static position of the device with the pressing head 24 raised to open position with the inlet valve 74 closed, the exhaust valve 86 closed and the actuator 190 moved to its lowest position within the enlargement 184.

Figure 3:
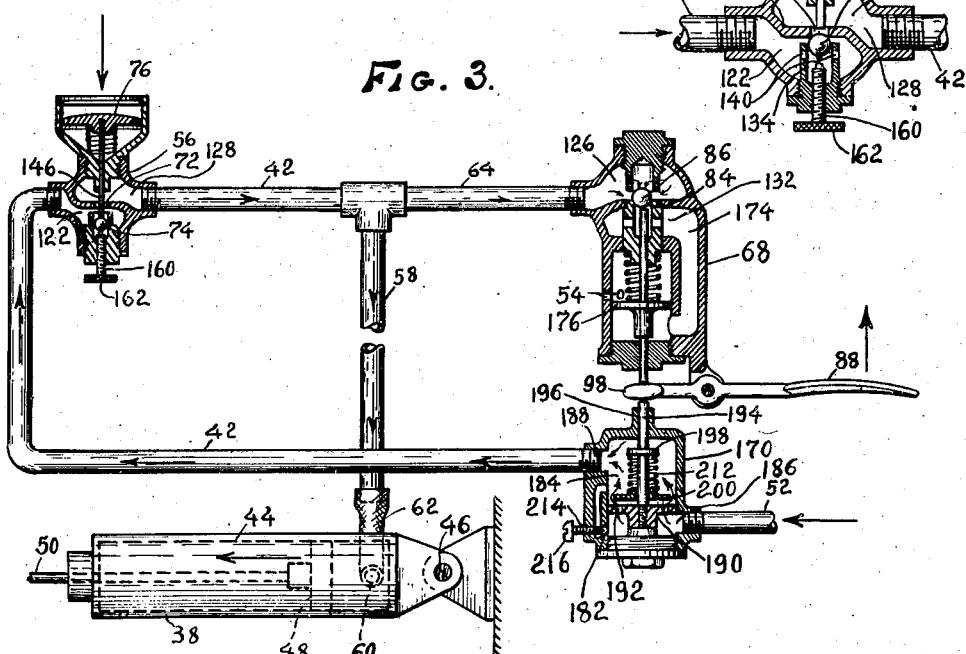
Figure 6:
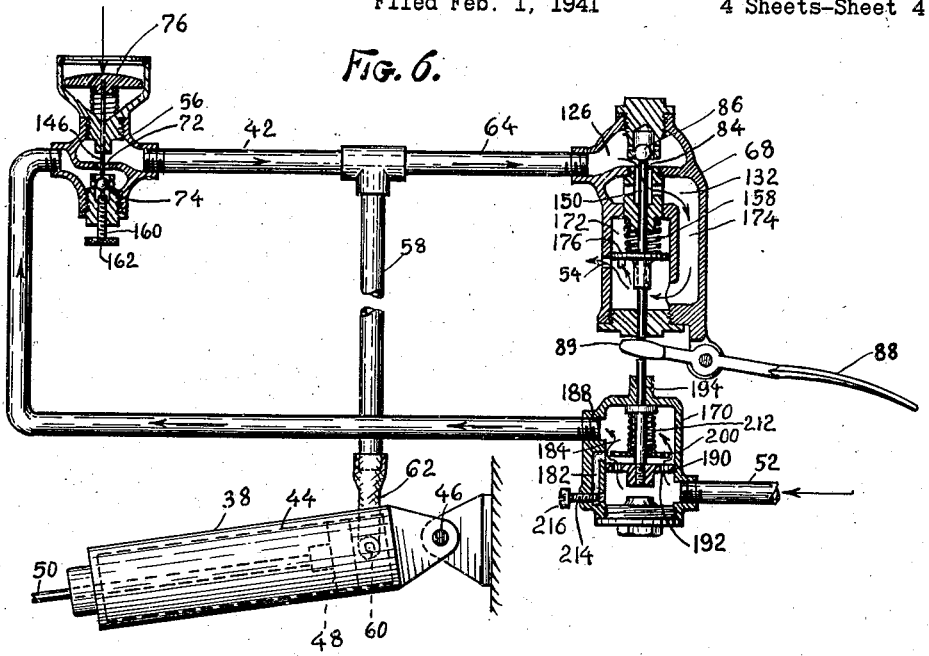

If the handle 76 of the inlet valve only is depressed, as shown in Fig. 6, the inlet valve 56 will immediately become open to permit the passage of fluid flow through the inlet line to the fluid motor and will provide manually controlled, remote control priming means to initiate a flow of fluid through the line to actuate another flow control member, in this instance the piston 190, which will then automatically raise the actuating portion 89 of the handle 88 upwards to cause it to raise the valve stem 150 to move the exhaust valve 86 from its seat 84, and simultaneously the counter-thrust piston 176 above the vent means 54 against the pressure of the spring to initiate the exhaust flow of fluid from the fluid motor. To permit the continuous flow of fluid through said inlet line, the relief valve 200 is automatically urged by the rapid flow of fluid through said inlet line against the pressure of the spring 212 to an open position permitting the rapid inlet flow through said enlargement 184. It is thus obvious, as shown in Fig. 6, with said inlet handle 76 only actuated, there will be a rapid flow of fluid through said inlet line toward the fluid motor, and an equally rapid exhaust from the fluid motor, with no actuation of the fluid motor. To accomplish any result, therefore, it is obvious that the handle 88 for actuating the exhaust valve 86 must be retained in a fixed neutral position prior to depression of the handle 76 of the inlet valve 74, as shown in Fig. 3, so that the inlet flow will be unable to raise the piston 190 upwards within the enlargement 184 against the pressure of the hand holding the handle 88 in a fixed neutral position to cause the work arm 89 thereof to hold the piston rod 194 down to keep the piston 190 in the lower end of the enlargement 184 and prevent it in any manner from raising the valve stem 150 to open the exhaust valve 86. It is obvious that the relief valve 200 will function in similar fashion, to the manner shown in Fig. 6, to bypass the inlet flow through the enlargement 184, the manually controlled means 76 for opening the inlet valve functioning as a remote control priming means for causing actuation of the relief valve 200. It is also obvious that the depression of the handle 76 for opening the inlet valve 74 will cause a flow of fluid out through the outlet line 64 to cause the flow of fluid through said outlet line to aid gravity in maintaining the outlet valve 86 in closed position closing its port 84, it being obvious that said handle 76 also functions as remote control priming means to permit the flow of fluid to maintain said exhaust valve 86 in a closed position. It is thus obvious that with the outlet valve 86 maintained in a closed position and the inlet valve 74 retained open by the handle 76 that fluid will flow in the direction of the arrows as shown in Fig. 3 through the inlet line 42, including the enlargement 184 thereof, through said vent means 192, through the open inlet port 72 and to the fluid motor 38 to urge the piston 48 thereof from the position shown in dotted lines in Fig. 2 to the position shown in dotted lines in Fig. 3.

Fig. 4 illustrates the position the parts assume substantially at the instant when the pressing head 24 is brought into pressing juxtaposition with the buck 22 at which instant there will be a diminution in inlet flow through the inlet line 42. The inlet flow will be so diminished as to be no longer capable of raising the actuator or piston 190, which will fall by gravity to its lowermost position. The diminished inlet flow, however, will be bypassed through the bypass line 182, the needle valve 216 being adjusted the desired amount to regulate the diameter of the bypass line for the desired increment of flow to the fluid motor. This diminished inlet flow will not be sufficient to raise the relief valve 200 against the pressure of the spring 212, and the spring 212 will urge it to a position closing the vent means 192 and thus the actuating piston 190 will not urge its piston rod 194 upwards against the work arm 89 of the handle 88 and therefore, there will be no pressure upwards on the valve stem 150 to raise the exhaust valve 86 from its exhaust valve seat 84. As shown in Fig. 4, the diminished flow of fluid through the inlet line will not be sufficient to urge the inlet valve 74 into a position closing its valve seat 72, but it will remain by gravity in the depressed position shown in Fig. 4, allowing an increased flow through the inlet line 42 to the fluid motor to move the piston 48 from the position shown in Fig. 3 to the position shown in Fig. 4, the amount of inlet flow being regulated by an adjustment of the adjusting screw 162 and the needle screw 216. There will be, however, a continuance of outlet flow through said outlet line 64 to the inlet chamber 126 of said exhaust valve 86 so that the fluid flow will aid gravity in maintaining the exhaust valve 86 in a position closing its respective port 84, thereby permitting one hand to be released from the operating handle 88 for the exhaust valve 86 and the other hand to be released from the operating handle 76 for the inlet valve 74, while an additional flow of fluid will be provided through said inlet line through the bypass line 182 of the enlargement 184, through the now open inlet port 72 to the fluid motor, with the exhaust valve 86 being maintained in a closed position by said fluid flow during the application of the ironing pressure and the continuance of the movement of the piston 48 to the opposite end of the cylinder 44. If, however, sustained pressure merely be desired for the ironing operation, the bypass line 182 may be omitted and the valve 74 made of such a weight as to be readily closed by the diminished flow.

Figure 5:
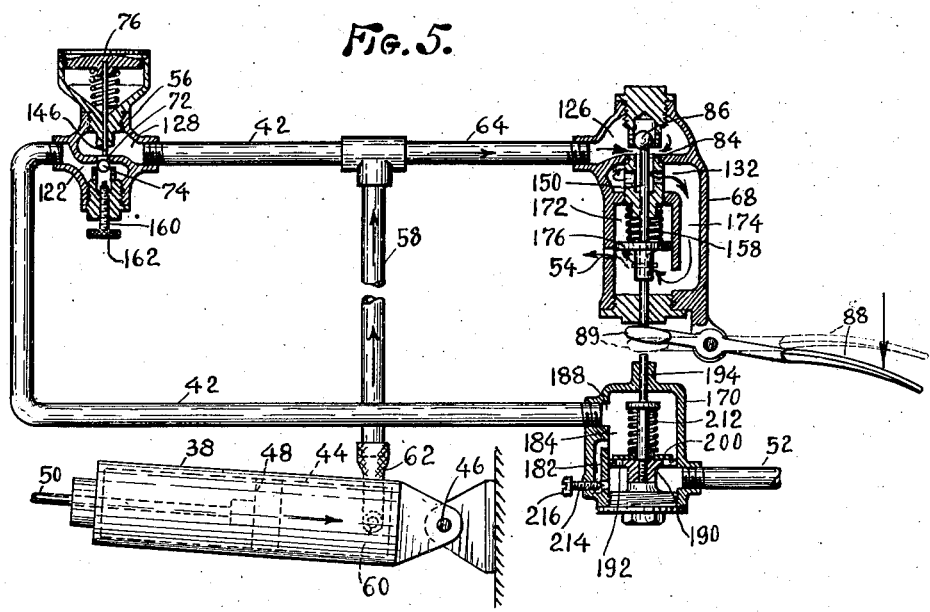

When it is then desired to evacuate the fluid motor to separate the pressing members 22 and 24, the handle 88 of the supplemental exhaust valve may be manually operated by foot or hand power to actuate the valve stem 150 to move the exhaust valve 86 from the port 84 to permit flow of fluid out through the discharge end 54 of the outlet line. Fig. 5 shows the device in the act of evacuating the fluid cylinder.

As stated hitherto, when the work arm 89 of the operating handle 88 is initially raised, the counter-thrust piston 176 secured thereto will also be raised in said exhaust chamber 172 above said vent means 54 against the pressure of said spring means 158. As also stated hitherto, the flow through the outlet chamber 132 of said exhaust valve, the passage 174, the exhaust chamber 172 and said vent means 54 will automatically maintain said counter-thrust piston 176 in a raised position compressing the spring 158 for this purpose above said vent means 54 to permit release of said handle 88, the counter-thrust piston 176 being continuously maintained in a raised position by the flow out through said exhaust end 54 for simultaneously maintaining the valve stem 150 in a raised position and maintaining said exhaust valve 86 in a position free of its exhaust port 84 until the fluid motor 38 has been completely exhausted. It is thus obvious that the present device shows the same safety features as set forth in the aforesaid applications, only in this instance the fluid motor is actuated when one handle is maintained in neutral position and the other handle depressed, both hands, however, being occupied until the pressing members have been brought into pressing juxtaposition when they may be both removed and the device will automatically function to apply the ironing pressure freeing the hands of the operator for other purposes.

By comparison with the structure of the controls of my aforesaid application, Control for pressing machines, it will be seen that I have reduced the number of valves from three to two, employing the handle for the exhaust valve as a means to permit the fluid flow to retain the exhaust valve in a closed position during the actuation of the fluid motor.

I also preferably employ, as shown in said application, a pivot link 202 in said linkage 40 pivotable on one fulcrum 204 to rapidly bring the pressing members into pressing juxtaposition and thereafter on a different fulcrum 206 to exert increased ironing pressure on the movable pressing head as described in detail in said application.

It is obvious, therefore, that this change in fulcrum will take place substantially when the pressing members have been brought into pressing position. As stated, as the flow in the inlet line diminishes, substantially at this instant both means for increasing the ironing pressure will function substantially simultaneously, and the diminution of the rate of flow will release the actuation of the actuating means 170 so that both operating handles 76 and 88 may be released when the members have been brought into pressing juxtaposition and prior to the application of increased ironing pressure. If desired, however, any type of linkage may be employed whether or not it increases the leverage for the application of ironing pressure.

Figure 7:
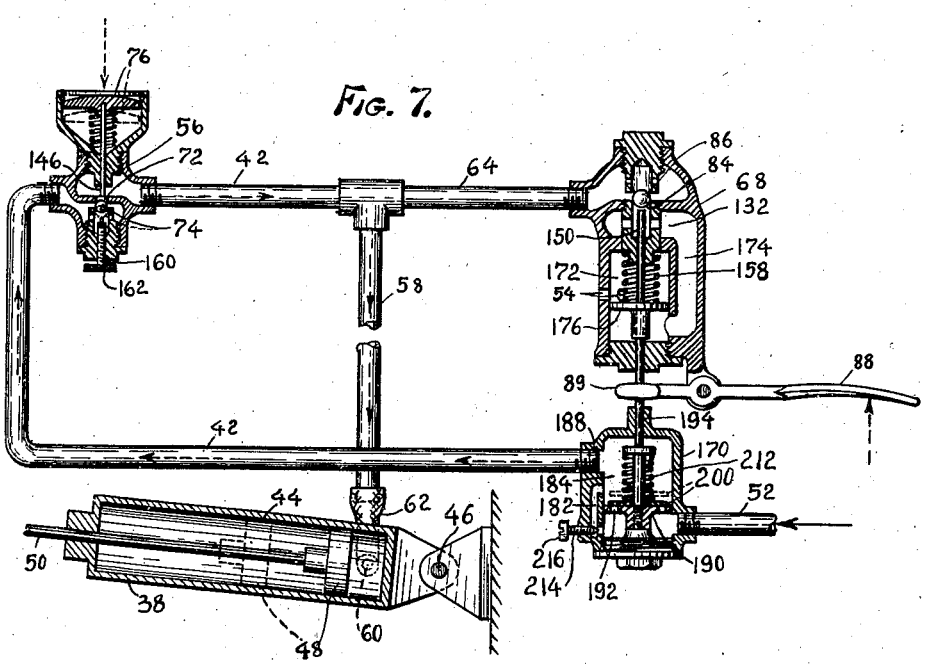
Fig. 7 is a diagrammatic view of the parts shown in Figs. 2–6, generally similar to Fig. 3, showing the handle for actuating the inlet valve and the piston in two positions for a step-by-step actuation of the fluid motor while the handle for the exhaust valve is being retained in a neutral position.

I have shown in Fig. 7 my device used to apply a step-by-step increment of ironing pressure after the pressing members have been brought into pressing juxtaposition. Both handles 88 and 76 may be temporarily respectively gripped and depressed, and released for a short actuation of the respective valves to apply a step-by-step flow for a step-by-step movement of the piston 48 to the dotted line position shown in Fig. 4.

As stated hitherto, it is obvious that each of the valve closures 74 and 86 in the valves 56 and 68 are moved by the flow to one of their positions, the valve closure 74 being moved by the flow to a closed position, and the valve closure 86 being moved by the flow to a closed position and that means are provided to move said valves to their respective opposite positions, namely, the handle 76 to move the ball valve 74 to an open position, and the handle 88 to move the ball valve 86 to an open position. It is also apparent that the ball valve 74 will tend to drop by gravity to an open position, and the ball valve 86 will tend to drop by gravity to a closed position, and it is thus obvious that the flow will operate against gravity to close the ball valve 74, and with gravity to maintain the ball valve 86 in a closed position. As stated hitherto, I believe the specific structure of these valves making these features possible is new. It is also apparent that the handle 76 opening the inlet valve 74 functions as manually controlled priming means remote from the flow control member or ball valve 86 to initiate the flow to retain the ball valve 86 in a closed position. As stated hitherto, in the embodiment shown I have employed ball valves, although it is obvious that any other type of a valve may be employed.

Particularly in pressing machines, it is desirable to apply a supplemental maximum amount of pressure during the ironing, and for this purpose the inlet valve 74 shown of such a weight that it will drop by gravity on a diminished flow of fluid in said line to permit a further actuation of the fluid motor 44 to apply additional pressure during the application of ironing pressure. It is obvious, however, that if desired for pressing or other purposes the valve 74 may be constructed so as to merely hold the fluid motor in a position to apply a sustained pressure but not an increased pressure.

It is apparent that I have provided a novel type of flow control means for pressing machines with the advantages described above.

It is understood that my invention is not limited to the specific embodiment shown and that various deviations may be made therefrom without departing from the spirit and scope of the appended claims.

What I claim is:

1. In a pressing machine, relatively movable pressing members, actuating means including a fluid motor for relatively moving said members to a pressing position and maintaining pressure, an inlet and outlet conduit system for said fluid motor having inlet valve means and outlet valve means, and manual means for effecting closure of said outlet valve means and for effecting opening of said inlet valve means, the weight of said valve means being such that the diminution of flow of fluid through said conduit system as said pressing members reach a pressing position is effective to maintain said outlet valve means closed and inlet valve means open to permit the release of said manually actuated means during the application of pressure.

2. In a pressing machine, relatively movable pressing members, actuating means including a fluid motor to relatively move said members to a pressing position and thereafter applying pressure, an inlet line for said fluid motor, an outlet line for said fluid motor, an inlet valve in said inlet line having a valve port and a movable valve member urged to a position closing said port by a rapid flow of fluid through said line, manually operated means for moving said valve member away from said port to permit flow of fluid therethrough, said valve member being capable of being retained in an open position by a diminished flow of fluid therethrough, an exhaust valve in the exhaust line having a valve port and a movable valve member urged to a closed position against said port to prevent flow of fluid therethrough by a flow of fluid through said line and manually operated means for moving said valve member free of said port to permit flow of fluid therethrough to exhaust said fluid motor, manually maintainable in a closed position to permit the flow of fluid to keep said exhaust valve closed while said pressing members are being brought into pressing juxtaposition, and means actuated by the flow of fluid to urge said manually operated means to move said exhaust valve to an open position automatically releasable with a delayed action by a diminished flow of fluid through said inlet line as said pressing members are brought into pressing juxtaposition to permit flow closing of said exhaust valve for a continued further actuation of said fluid motor to apply said pressure to said pressing members.

3. In a pressing machine, relatively movable pressing members, actuating means including a fluid motor to relatively move said members to a pressing position, an inlet line for said fluid motor, an outlet line for said fluid motor, an inlet valve in said inlet line having a valve port and a movable valve member urged to a position closing said port by a flow of fluid through said line, manually operated means for moving said valve member away from said port to permit flow of fluid therethrough, an exhaust valve in the the exhaust line having a valve port and a movable valve member urged to a closed position against said port to prevent flow of fluid therethrough by a flow of fluid through said line and manually operated means for moving said valve member free of said port to permit flow of fluid therethrough to exhaust said fluid motor, manually maintainable in a closed position to permit the flow of fluid to keep said exhaust valve closed while said pressing members are being brought into pressing juxtaposition, and means actuated by the flow of fluid to urge said manually operated means to move said exhaust valve to an open position automatically releasable with a delayed action by a diminished flow of fluid through said inlet line as said pressing members are brought into pressing juxtaposition to permit flow closing of said exhaust valve for a continued actuation of said fluid motor to maintain pressure on said pressing members.

4. In a pressing machine, relatively movable pressing members, a fluid motor for rapidly relatively moving said members to a pressing position and applying pressure, an inlet line for said fluid motor, an outlet line for said fluid motor, an inlet valve in said inlet line having a valve port, a movable inlet valve member urged to a position closing said port by a rapid flow of fluid through said line and manually operable means for moving said valve member away from said port to permit flow of fluid therethrough, said valve member being capable of being retained in an open position by a diminished flow of fluid therethrough, an exhaust valve in the exhaust line having a valve port and a movable exhaust valve member urged to a position closing said port by the flow of fluid through said line, means in said line actuated by the flow of fluid through said line for maintaining said movable exhaust valve member in a position free of said port to permit the continuous flow of fluid therethrough, and manually operable means for initially moving said valve member away from said port to initiate the exhaust flow of fluid therethrough; means actuated by the flow of fluid through said inlet line for urging said last mentioned manually operable means to a flow initiating position whereby actuation of said manually operable means for opening said inlet valve and retention of said manually operated means for opening said exhaust valve in a non-actuating position may actuate said fluid motor and release of the manually actuated means for the exhaust valve may permit said urging means to open said exhaust valve to initiate the evacuation of the motor, means for bypassing a rapid inlet flow through said urging means to initially rapidly actuate said fluid motor, automatically rendered inoperative by a diminished inlet flow as said pressing members are brought into pressing juxtaposition and means for bypassing the diminished inlet flow around said urging means to prevent actuation of said urging means on a diminished inlet flow to permit release of said manually actuated means for controlling the exhaust valve and the manually actuated means for controlling the inlet valve during the application of pressure.

5. In a pressing machine, relatively movable pressing members, a fluid motor for rapidly relatively moving said members to a pressing position and applying pressure, an inlet line for said fluid motor, an outlet line for said fluid motor; an inlet valve in said inlet line having a valve port, a movable inlet valve member urged to a position closing said port by a rapid flow of fluid through said line and manually operable means for moving said valve member away from said port to permit flow of fluid therethrough, said valve member being capable of being retained in an open position by a diminished flow of fluid therethrough; an exhaust valve in the exhaust line having a valve port and a movable exhaust valve member urged to a position closing said port by the flow of fluid through said line, and manually operable means for moving said valve member away from said port to permit the exhaust flow of fluid therethrough; means actuated by the flow of fluid through said inlet line for urging said last mentioned manually operable means to a flow initiating position whereby actuation of said manually operable means for opening said inlet valve and retention of said manually operated means for opening said exhaust valve in a non-actuating position may actuate said fluid motor and release of the manually actuated means for the exhaust valve may permit said urging means to open said exhaust valve to evacuate the motor; means for bypassing a rapid inlet flow through said urging means to initially rapidly actuate said fluid motor, automatically rendered inoperative by a diminished inlet flow as said pressing members are brought into pressing juxtaposition and means for bypassing the diminished inlet flow around said urging means to prevent actuation of said urging means on a diminished inlet flow to permit release of said manually actuated means for controlling the exhaust valve and the manually actuated means for controlling the inlet valve during the application of pressure.

6. In a pressing machine, relatively movable pressing members, a fluid motor for relatively moving said members to a pressing position and applying pressure, an inlet line for said fluid motor, an outlet line for said fluid motor; an inlet valve in said inlet line having a valve port, a movable inlet valve member urged to a position closing said port by a rapid flow of fluid through said line and manually operable means for moving said valve member away from said port to permit flow of fluid therethrough; an exhaust valve in the exhaust line having a valve port and a movable exhaust valve member urged to a position closing said port by the flow of fluid through said line, means in said line actuated by the flow of fluid through said line for maintaining said movable exhaust valve member in a position free of said port to permit the continuous flow of fluid therethrough, and manually operable means for initially moving said valve member away from said port to initiate the exhaust flow of fluid therethrough; means actuated by the flow of fluid through said inlet line for urging said last mentioned manually operable means to a flow initiating position whereby actuation of said manually operable means for opening said inlet valve and retention of said manually operated means for opening said exhaust valve in a non-actuating position may actuate said fluid motor and release of the manually actuated means for the exhaust valve may permit said urging means to open said exhaust valve to initiate the evacuation of the motor and means for bypassing an inlet flow through said urging means to actuate said fluid motor, automatically rendered inoperative by a diminished inlet flow as said pressing members are brought into pressing juxtaposition.

7. In a pressing machine, relatively movable pressing members, a fluid motor for relatively moving said members to a pressing position and applying pressure, an inlet line for said fluid motor, an outlet line for said fluid motor; an inlet valve in said inlet line having a valve port, a movable inlet valve member urged to a position closing said port by a rapid flow of fluid through said line and manually operable means for moving said valve member away from said port to permit flow of fluid therethrough; an exhaust valve in the exhaust line having a valve port and a movable exhaust valve member urged to a position closing said port by the flow of fluid through said line, and manually operable means for moving said valve member away from said port to permit the exhaust flow of fluid therethrough; means actuated by the flow of fluid through said inlet line for urging said last mentioned manually operable means to a flow initiating position whereby actuation of said manually operable means for opening said inlet valve and retention of said manually operated means for opening said exhaust valve in a non-actuating position may actuate said fluid motor and release of the manually actuated means for the exhaust valve may permit said urging means to open said exhaust valve to evacuate the motor and means for bypassing an inlet flow through said urging means to actuate said fluid motor, automatically rendered inoperative by a diminished inlet flow as said pressing members are brought into pressing juxtaposition.

8. In a pressing machine, relatively movable pressing members, a fluid motor for relatively moving said members to a pressing position and applying pressure, an inlet line for said fluid motor, an outlet line for said fluid motor; an inlet valve in said inlet line having a valve port, a movable inlet valve member urged to a position closing said port by a rapid flow of fluid through said line and manually operable means for moving said valve member away from said port to permit flow of fluid therethrough; an exhaust valve in the exhaust line having a valve port and a movable exhaust valve member urged to a position closing said port by the flow of fluid through said line, and manually operable means for moving said valve member away from said port to permit the exhaust flow of fluid therethrough; means actuated by the flow of fluid through said inlet line for urging said last mentioned manually operable means to a flow initiating position whereby actuation of said manually operable means for opening said inlet valve and retention of said manually operated means for opening said exhaust valve in a non-actuating position may actuate said fluid motor and release of the manually actuated means for the exhaust valve may permit said urging means to open said exhaust valve to evacuate the motor; means for bypassing an inlet flow through said urging means to actuate said fluid motor, automatically rendered inoperative by a diminished inlet flow as said pressing members are brought into pressing juxtaposition, and means to vary the movement of said inlet valve member.

9. In combination, a flow line, flow control mechanism in said line, an actuator for said flow control mechanism, comprising means in said line actuated by the flow of fluid through said line for actuating said flow control mechanism, means for bypassing a rapid flow through said actuator automatically rendered inoperative by a diminished flow and means for bypassing a diminished flow around said actuator to prevent actuation of said actuator by a diminished flow.

10. In a pressing machine, relatively movable pressing members, a fluid motor for relatively moving said members to a pressing position and applying pressure, an inlet line for said fluid motor, an outlet line for said fluid motor having a portion aligned with and above a portion of said inlet line, an inlet valve in said inlet line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port and a valve stem having a handle operable from without said chamber to abut and move said valve away from said port, said valve being of such a weight as to be moved by the flow of fluid in said socket to close said port and to be maintained by gravity in an open position on a diminished flow through said line, said lower chamber also having an adjusting screw projecting upwardly within said socket to regulate the reciprocatable movement of the valve in said socket and hence its sensitivity to the velocity of flow to which it responds, an exhaust valve in said exhaust line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port, said valve being of such a weight as to be moved by gravity and the flow of fluid in said socket to a position closing said port, and a valve stem operable from below said valve to abut and move said valve to a position away from said port, an exhaust chamber below said socket having exhaust vent means therein and connected to said outlet portion, said valve stem having a counter-thrust piston secured thereto, reciprocatable within said exhaust chamber to positions above and below said exhaust vent means and spring means in said exhaust chamber normally urging said counter-thrust piston and attached valve stem to a closed position below said vent means, a hand lever mounted on said outlet line having a work arm for initially moving said valve stem upwards against the pressure of said spring means to displace said exhaust valve and permit the flow of fluid to automatically raise said counter-thrust piston to permit a continuous discharge through said exhaust vent means, a cylindrical enlargement in the portion of the inlet line immediately below said exhaust valve and valve stem and work arm of said hand lever having an inlet port therein at the lower end thereof and an outlet port therein near the upper end thereof, a piston movable back and forth in said enlargement having vent means therein and a piston rod projecting upwardly therefrom through said enlargement to abut the work arm of said handle to initiate the opening of said exhaust valve and having a stop centrally thereof to limit the upward movement of said piston within said enlargement; an adjustable bypass line of lesser diameter connected to said enlargement beyond the extremities of movement of said piston, a relief valve for closing said vent means and spring means seated on said stop and abutting said relief valve to move said relief valve to a position normally closing said vent means automatically yieldable to permit a rapid inlet flow of fluid through said vent means, said piston and relief valve being automatically movable by gravity to the bottom of said enlargement on diminution or cessation of flow therethrough.

11. In a pressing machine, relatively movable pressing members, a fluid motor for relatively moving said members to a pressing position and applying pressure, an inlet line for said fluid motor, an outlet line for said fluid motor, an inlet valve in said inlet line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port and a valve stem having a handle operable from without said chamber to abut and move said valve away from said port, said valve being of such a weight as to be moved by the flow of fluid in said socket to close said port, an exhaust valve in said exhaust line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port, said valve being of such a weight as to be moved by the flow of fluid in said socket to a position closing said port, and a valve stem operable from below said valve to abut and move said valve to a position away from said port, a hand lever mounted on said outlet line having a work arm for moving said valve stem upwards to displace said exhaust valve, a cylindrical enlargement in the inlet line having an inlet port therein at the lower end thereof and an outlet port therein near the upper end thereof, a piston movable back and forth in said enlargement having vent means therein and a piston rod projecting upwardly therefrom through said enlargement to actuate said hand lever to open said exhaust valve and having a stop centrally thereof to limit the upward movement of said piston within said enlargement, a relief valve for closing said vent means, and spring means seated on said stop and abutting said relief valve to move said relief valve to a position normally closing said vent means automatically yieldable to permit a rapid inlet flow of fluid through said vent means, said piston and relief valve being automatically movable by gravity to the bottom of said enlargement on diminution or cessation of flow therethrough.

12. In a pressing machine, relatively movable pressing members, a fluid motor for relatively moving said members to a pressing position and applying pressure, an inlet line for said fluid motor, an outlet line for said fluid motor, an inlet valve in said inlet line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port and a valve stem having a handle operable from without said chamber to abut and move said valve away from said port, said valve being of such a weight as to be moved by the flow of fluid in said socket to close said port, an exhaust valve in the exhaust line having a valve port and a movable exhaust valve member urged to a position closing said port by the flow of fluid through said line, means in said line actuated by the flow of fluid through said line for maintaining said movable exhaust valve member in a position free of said port to permit the continuous flow of fluid therethrough, and manually operable means for moving said valve member away from said port to permit the exhaust flow of fluid therethrough; means actuated by the flow of fluid through said inlet line for urging said last mentioned manually operable means to a flow initiating position whereby actuation of said handle for opening said inlet valve and retention of said manually operated means for opening said exhaust valve in a non-actuating position may actuate said fluid motor and release of the manually actuated means for the exhaust valve may permit said urging means to open said exhaust valve to evacuate the motor, and means for bypassing an inlet flow through said urging means to actuate said fluid motor, automatically rendered inoperative by a diminished inlet flow as said pressing members are brought into pressing juxtaposition.

13. In a pressing machine, relatively movable pressing members, a fluid motor for relatively moving said members to a pressing position and applying pressure, an inlet line for said fluid motor, an outlet line for said fluid motor, an inlet valve in said inlet line having a valve port, a movable inlet valve member urged to a position closing said port by a flow of fluid through said line and manually operable means for moving said valve member away from said port to permit flow of fluid therethrough, an exhaust valve in said exhaust line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port, said valve being of such a weight as to be moved by the flow of fluid in said socket to a position closing said port, and a valve stem operable from below said valve to abut and move said valve to a position away from said port, a hand lever mounted on said outlet line having a work arm for initially moving said valve stem upwards against the pressure of said spring means to displace said exhaust valve, means actuated by the flow of fluid through said inlet line for urging said hand lever to a flow initiating position whereby actuation of said handle for opening said inlet valve and retention of said hand lever for opening said exhaust valve in a non-actuating position may actuate said fluid motor and release of the hand lever for the exhaust valve may permit said urging means to open said exhaust valve to evacuate the motor and means for bypassing an inlet flow through said urging means to actuate said fluid motor, automatically rendered inoperative by a diminished inlet flow as said pressing members are brought into pressing juxtaposition.

14. In a pressing machine, relatively movable pressing members, a fluid motor for relatively moving said members to a pressing position and applying pressure, an inlet line for said fluid motor, an outlet line for said fluid motor, an inlet valve in said inlet line having a valve port, a movable inlet valve member urged to a position closing said port by the flow of fluid through said line and manually operable means for moving said valve member away from said port to permit flow of fluid therethrough; an exhaust valve in the exhaust line having a valve port and a movable exhaust valve member urged to a position closing said port by the flow through said line, and manually operable means for moving said valve member away from said port to exhaust fluid therethrough; a cylindrical enlargement in the inlet line having an inlet port therein at the lower end thereof and an outlet port therein near the upper end thereof, a piston movable back and forth in said enlargement having vent means therein and a piston rod projecting upwardly therefrom through said enlargement to actuate said manually operable means to open said exhaust valve and having a stop centrally thereof to limit the upward movement of said piston within said enlargement, a relief valve for closing said vent means, and spring means seated on said stop and abutting said relief valve to move said relief valve to a position normally closing said vent means automatically yieldable to permit a rapid inlet flow of fluid through said vent means, said piston and relief valve being automatically movable by gravity to the bottom of said enlargement on diminution or cessation of flow therethrough.

15. In a fluid system, a flow line, an exhaust valve in said line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port, said valve being of such a weight as to be moved by the flow of fluid in said socket to a position closing said port, and a valve stem operable from below said valve to abut and move said valve to a position away from said port, an exhaust chamber below said socket having exhaust vent means therein and connected to said outlet portion, said valve stem having a counter-thrust piston secured thereto, reciprocatable within said exhaust chamber to positions above and below said exhaust vent means and spring means in said exhaust chamber normally urging said counter-thrust piston and attached valve stem to a closed position below said vent means, a hand lever mounted on said line having a work arm for initially moving said valve stem upwards against the pressure of said spring means to displace said exhaust valve and permit the flow of fluid to automatically raise said counter-thrust piston to permit a continuous discharge through said exhaust vent means, a cylindrical enlargement in the portion of the line immediately below said exhaust valve and valve stem and work arm of said handle having an inlet port therein at the lower end thereof and an outlet port therein near the upper end thereof, a piston movable back and forth in said enlargement having vent means therein and a piston rod projecting upwardly therefrom through said enlargement to abut the work arm of said hand lever to initiate the opening of said exhaust valve and having a stop centrally thereof to limit the upward movement of said piston within said enlargement, an adjustable bypass line of lesser diameter connected to said enlargement beyond the extremities of movement of said piston, a relief valve for closing said vent means, and spring means seated on said stop and abutting said relief valve to move said relief valve to a position normally closing said vent means automatically yieldable to permit a rapid flow of fluid through said vent means, said piston and relief valve being automatically movable by gravity to the bottom of said enlargement on diminution or cessation of flow therethrough.

16. In a fluid system, a flow line, an exhaust valve in said line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port, said valve being of such a weight as to be moved by the flow of fluid in said socket to a position closing said port, and a valve stem operable from below said valve to abut and move said valve to a position away from said port, a hand lever mounted on said line having a work arm for moving said valve stem upwards to displace said exhaust valve, a cylindrical enlargement in the inlet line having an inlet port therein at the lower end thereof and an outlet port therein near the upper end thereof, a piston movable back and forth in said enlargement having vent means therein and a piston rod projecting upwardly therefrom through said enlargement to actuate said hand lever to open said exhaust valve and having a stop centrally thereof to limit the upward movement of said piston within said enlargement, a relief valve for closing said vent means, and spring means seated on said stop and abutting said relief valve to move said relief valve to a position normally closing said vent means automatically yieldable to permit a rapid flow of fluid through said vent means, said piston and relief valve being automatically movable by gravity to the bottom of said enlargement on diminution or cessation of flow therethrough.

17. In a fluid system, a flow line, an exhaust valve in said line comprising a valve chamber having a partition having a port therein dividing said chamber into an inlet portion and an outlet portion, a socket projecting toward said port in said inlet portion and terminating at a spaced distance therefrom and having a passage from said portion in the wall thereof, a valve reciprocatable in said socket beyond said passage to and from positions closing said port, said valve being of such a weight as to be moved by the flow of fluid in said socket to a position closing said port, and a valve stem operable from below said valve to abut and move said valve to a position away from said port, an exhaust chamber below said socket having exhaust vent means therein and connected to said outlet portion, said valve stem having a counter-thrust piston secured thereto, reciprocatable within said exhaust chamber to positions above and below said exhaust vent means and spring means in said exhaust chamber normally urging said counter-thrust piston and attached valve stem to a closed position below said vent means, and a handle mounted on said line for initially moving said valve stem upwards against the pressure of said spring means to displace said exhaust valve and permit the flow of fluid to automatically raise said counter-thrust piston to permit a continuous discharge through said exhaust vent means.

18. In a fluid system, a flow line having an upwardly extending cylindrical enlargement having an inlet port therein at the lower end thereof and an outlet port therein near the upper end thereof, a piston movable back and forth in said enlargement having vent means therein and a piston rod projecting upwardly therefrom through said enlargement and having a stop centrally thereof to limit the upward movement of said piston within said enlargement, an adjustable bypass line of lesser diameter connected to said enlargement beyond the extremities of movement of said piston, a relief valve for closing said vent means, and spring means seated on said stop and abutting said relief valve to move said relief valve to a position normally closing said vent means automatically yieldable to permit a rapid flow of fluid through said vent means, said piston and relief valve being automatically movable by gravity to the bottom of said enlargement on diminution or cessation of flow therethrough.

19. In a fluid system, a flow line having an upwardly extending cylindrical enlargement having an inlet port therein at the lower end thereof and an outlet port therein near the upper end thereof, a piston movable back and forth in said enlargement having vent means therein and a piston rod projecting upwardly therefrom through said enlargement and having a stop centrally thereof to limit the upward movement of said piston within said enlargement, a relief valve for closing said vent means, and spring means seated on said stop and abutting said relief valve to move said relief valve to a position normally closing said vent means automatically yieldable to permit a rapid flow of fluid through said vent means, said piston and relief valve being automatically movable by gravity to the bottom of said enlargement on diminution or cessation of flow therethrough.

FRANK C. LORNITZO.